United States Patent [19]

Suzuki et al.

[11] 4,145,755

[45] Mar. 20, 1979

[54] INFORMATION TRANSFERRING APPARATUS

[75] Inventors: Seigo Suzuki, Yokohama; Seiji Eguchi, Kawasaki; Yoshiaki Moriya, Inagi, all of Japan

[73] Assignee: Tokyo Shibaura Electric Co., Ltd., Kawasaki, Japan

[21] Appl. No.: 732,966

[22] Filed: Oct. 15, 1976

[30] Foreign Application Priority Data

Oct. 15, 1975 [JP] Japan .................................. 50-123236

[51] Int. Cl.$^2$ .......................... G06F 3/00; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,482,214 | 12/1969 | Sichel et al. | 340/172.5 |
| 3,573,745 | 4/1971 | May | 340/172.5 |
| 3,689,897 | 9/1972 | Sciuchetti | 340/172.5 |
| 3,693,161 | 9/1972 | Price et al. | 340/172.5 |
| 3,771,142 | 11/1973 | Minshull et al. | 340/172.5 |
| 3,818,461 | 6/1974 | Ward et al. | 340/172.5 |
| 3,878,513 | 4/1975 | Werner | 340/172.5 |
| 3,898,626 | 8/1975 | Hutson et al. | 340/172.5 |

*Primary Examiner*—Mark E. Nusbaum

*Attorney, Agent, or Firm*—Finnegan, Henderson, Farabow & Garrett

[57] ABSTRACT

The system comprises a central information processing unit, an input/output unit, a first-in first-out stack which is connected to receive information from the central information processing unit for sending a "FULL" signal to the central information processing unit when the stack is filled with the information sent from the central information processing unit and for sending thereto an "EMPTY" signal when the stack is empty, an input/output control circuit which operates to transfer the information from the first-in first-out stack to the input/output unit and to detect the state thereof for sending a "READY" signal to the central processing unit when the input/output unit is in a state ready for accepting the information, a command register coupled to the central information processing unit to be set at a particular bit by a bit signal sent from the central processing unit when it receives the "FULL" signal from the first-in first-out stack and the "READY" signal from the input/output control circuit, and a buffer control circuit energized by the output signal from the command register set at the particular bit for applying a transfer commencement command signal to the first-in first-out stack thereby causing it to transfer information to the input/output unit via the input/output control unit.

4 Claims, 2 Drawing Figures

INFORMATION TRANSFERRING APPARATUS

BACKGROUND OF THE INVENTION

This invention relates to an information transferring system.

In a prior art information transferring system a first-in first-out type stack (hereinafter called a FIFO) has been used between an information processing unit and an input/output unit having different information processing speed to act as a data buffer register. Such FIFO stack is constructed to produce a "FULL" signal representing a state in which the capacity of the stack is filled with information and an "EMPTY" signal representing a state in which there is no information stored in the stack.

Thus, for example, a FIFO stack 20 is connected between a first information processing unit, for example, a central processing unit (CPU) 10 and a second information processing unit, such as an input/output unit (I/O) 30, as shown in FIG. 1. The central processing unit 10 operates to successively transfer information representing the results of operations to the FIFO stack 20 and stops its operation when a predetermined quantity of the information has been transferred. Thus, the FIFO stack 20 successively stores the information transferred from the central processing unit 10. The input/output unit 30 receives information from the FIFO stack 20 and processes at a processing speed different from that of the central processing unit 10 and stops its operation when a predetermined quantity of the information has been processed.

In such an information transferring system, where a line printer, for example, is used as the input/output unit 30, since the unit 30 requires information of about 16 to 32 words as one information block, it is necessary to store information of the predetermined number of words in the FIFO stack 20 before it begins to transfer the information to the input/output unit 30.

If the quantity of the information stored in the FIFO stack 20 is less than the predetermined number of words, dummy information is also transferred to the input/output unit 30 so that the input/output unit would produce an erroneous word information. On the other hand, where the quantity of the information stored in the FIFO stack 20 is larger than the predetermined number of words, related information would remain in the FIFO stack when the transfer of the information to the input/output unit 30 has been completed, thus failing to provide a perfect information processing. Where the related information is transferred to the input/output unit by the next transfer operation, as above described, dummy information may be also transferred thereby producing an erroneous word information from the input/output unit 30.

Accordingly, in order to correctly transfer the information it is essential to constantly detect the state of the input/output unit 30 by the information processing unit 10. But this requires an extremely complicated circuit.

Further, when the quantity of the information transferred to the input/output unit 30 and the quantity of the information stored in the FIFO stack are both equal to 32 words, simultaneously with the completion of the transfer, the input/output unit 30 stops its operation and the FIFO stack 20 apparently assumes an "EMPTY" state. As a result, FIFO stack 20 generates an "EMPTY" flag so that by detecting the flag from the FIFO stack instead of causing the information processing unit 10 to constantly detect the state of the input/output unit 30 a correct transfer of the information cannot be assured.

SUMMARY OF THE INVENTION

Accordingly, it is an object of this invention to provide an improved information transferring system which can adequately process a predetermined quantity of information by accurately designating the point of commencing the transfer of the information.

According to this invention there is provided an information processing system comprising first and second information processing units, a data buffering first-in first-out stack connected between the first and second information processing units, and a control circuit for detecting the state of the first-in first-out stack for supplying a control signal to the first-in first-out stack when the same assumes a predetermined state thereby designating a time for commencing information transfer between one of the first and second information processing units and the first-in first-out stack.

DESCRIPTION OF THE PREFERRED EMBODIMENT

Figure 2:
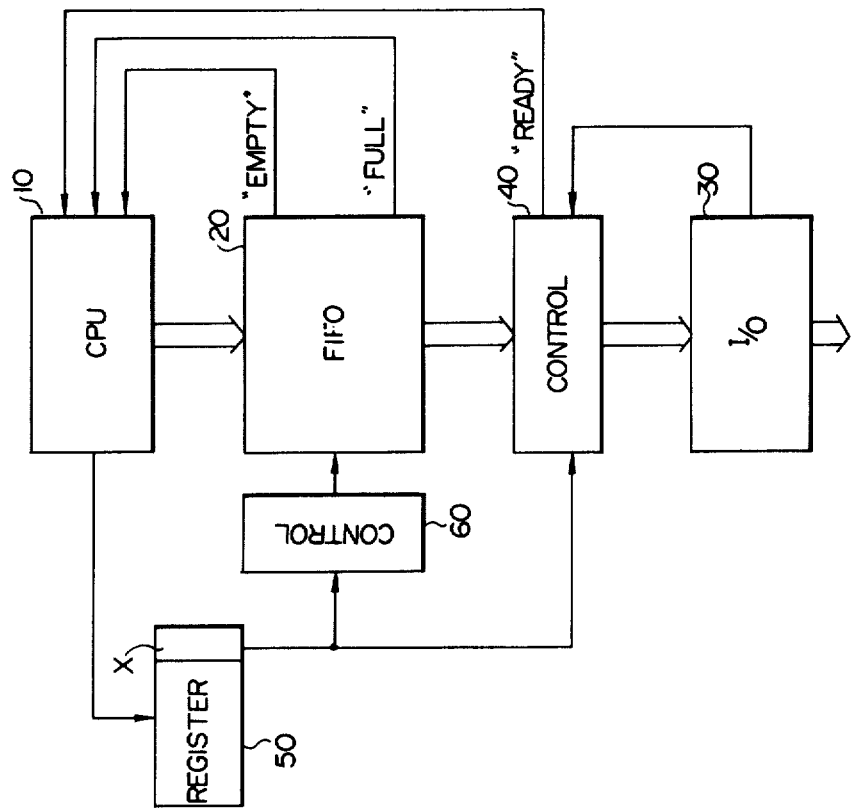
FIG. 2 is a block diagram showing one embodiment of the improved information transferring system of this invention.
Figure 1:
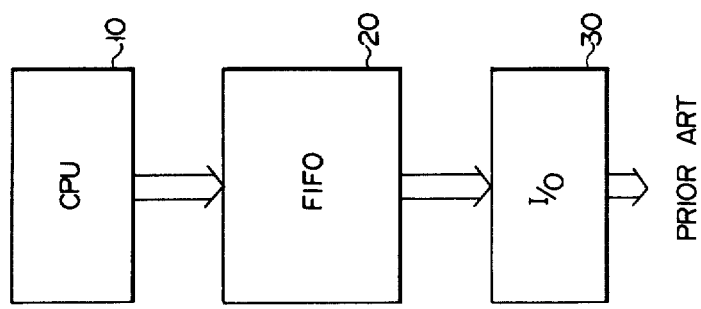
FIG. 1 is a block diagram showing a prior art information processing system.

In a preferred embodiment of this invention illustrated in FIG. 2, the component elements identical to those shown in FIG. 1 are designated by the same reference numerals.

Where there is no information stored in the FIFO stack 20 it sends an "EMPTY" signal to the central processing unit 10 whereas when the FIFO stack 20 is full of the information from the central processing unit 10 the FIFO stack sends thereto a "FULL" signal.

An input/output control circuit 40 connected between the FIFO stack 20 and the input/output unit 30 operates to detect the state thereof so as to send a "READY" signal to the central processing unit 10 when the input/output unit 30 assumes a state in which the I/O unit 30 is ready to receive information from the FIFO stack 20.

A command register 50 is provided to be controlled by programmed data from the central processing unit 10. When set to a predetermined bit state the command register operates to send an output signal to a buffer control circuit 60 and the input/output control circuit 40.

Considering a state wherein no information is stored in the FIFO stack 20, an "EMPTY" signal is sent to the central processing unit 10 from the FIFO stack so that information is transferred thereto from the central processing unit 10. When information of a predetermined quantity, for example 32 words is transferred, the FIFO stack 20 sends a "FULL" signal to the central processing unit 10 thereby stopping the operation of the unit 10.

Under these conditions, when the input/output control circuit 40 detects that the input/output unit 30 is in a state capable of accepting information, the input/output control circuit 40 transmits a "READY" signal to the central processing unit 10. In response to the "FULL" signal from the FIFO stack 20 and the "READY" signal from the input/output control circuit 40, the central processing unit 10 sends a set signal to the command register 50 to set the same to a particular bit position X. Then, in response to a command signal corresponding to the bit position X, the buffer control circuit 60 transmits an information transfer commencement command signal to the FIFO stack 20. At the same time, the input/output control circuit 40 receives the command signal from the command register 50 and transfers the information from the FIFO stack 20 to the input/output unit 30.

In this manner, all items of information that have been stored in the FIFO stack 20 are transferred to the input/output unit 30. When the FIFO stack 20 becomes empty it sends an "EMPTY" signal to the central processing unit 10 thus causing it to again transfer information to the FIFO stack 20. Thus, information data can be effectively transferred between the CPU 10 and the I/O unit 30.

As above described, the time of commencing information transfer to or from the FIFO stack 20 is determined by subjecting the command register 50 to the programmed control of the central processing unit 10 in accordance with the states of the FIFO stack and the input/output unit 30 so that information having a predetermined number of words is efficiently sent from the central processing unit 10 to the input/output unit 30 via the FIFO stack 20.

Where the input/output unit 30 is busy, no information is transferred thereto from the FIFO stack 20. Where it is requested to transfer information received by the central processing unit 10 to the FIFO stack 20 while the input/output unit 30 is busy, the information stored in the FIFO stack 20 is cleared thus enabling the transfer to the empty FIFO stack of new information received in the central processing unit 10. In this case, when the input/output unit 30 is not in use, it is not necessary to clear the information which has been stored in the FIFO stack 20.

Although in the illustrated embodiment the command register 50 is subjected to programmed control by the central processing unit 10 it is also possible to use an information processing unit independent of the central processing unit 10 and connected to receive state signals from the FIFO stack 20 and the input/output control circuit 40. With this modification it is also possible to control the command register 50 by the independent information processing unit.

What we claim is:

1. An information transferring system comprising first and second information processing units, a data buffering first-in first-out stack connected between said first and second information processing units for transferring data therebetween, means for supplying to said first information processing unit from said first-in first-out stack a "FULL" signal when said first-in first-out stack is fully stored with information data, means for supplying to said first information processing unit from said first-in first-out stack an "EMPTY" signal when no information data is stored in said first-in first-out stack, a first control unit connected to said first and second information processing units for supplying to said first information processing unit a "READY" signal indicating that said second information processing unit is in an operable state for accepting information, said first information processing unit including means responsive to said "EMPTY" signal to permit data transfer from said first information processing unit to said first-in first-out stack and means for providing a control signal upon simultaneous receipt of both said "FULL" and "READY" signals, a command register connected to said first information processing unit which is set to a predetermined bit state in response to said control signal from said first information processing unit, and a second control unit connected between said command register and said first-in first-out stack for supplying an output signal to said first-in first-out stack in response to the predetermined bit state of said command register to permit data transfer from said first-in first-out stack to said second information processing unit.

2. An information transferring system according to claim 1 wherein said first information processing unit is a central processing unit and said second information processing unit is an input/output unit.

3. An information transferring system according to claim 1, wherein said first information processing unit stops data transfer to said first-in first-out stack in response to said "FULL" signal.

4. An information transferring system according to claim 1, wherein said first control unit is connected between said first-in first-out stack and said second information processing unit and is also connected to said command register to permit data transfer between said first-in first-out stack and said second information processing unit in response to the predetermined bit state of said command register.

* * * * *